June 21, 1932.  P. L. GUMAER  1,864,509
DRUM BRAKE
Filed Nov. 22, 1930   3 Sheets-Sheet 1

INVENTOR
Pierre L. Gumaer
BY his ATTORNEY
R. J. Dearborn

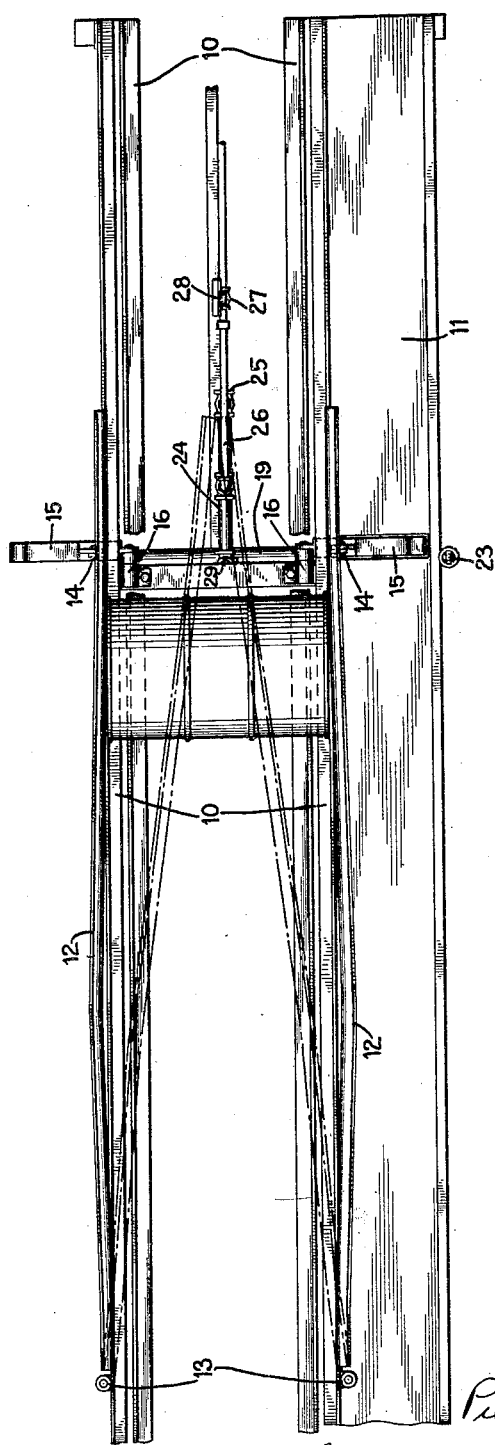

June 21, 1932.   P. L. GUMAER   1,864,509
DRUM BRAKE
Filed Nov. 22, 1930   3 Sheets-Sheet 3
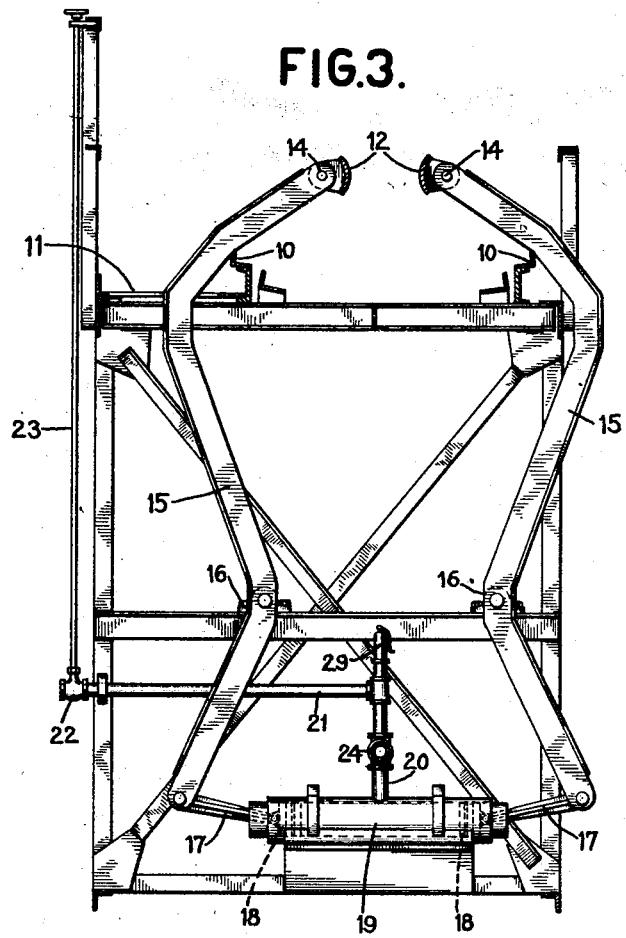
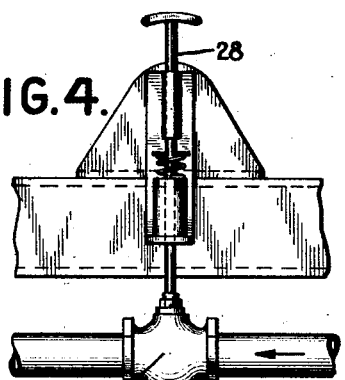
INVENTOR
Pierre L. Gumaer
BY ATTORNEY R. J. Dearborn Patented June 21, 1932

1,864,509

UNITED STATES PATENT OFFICE

PIERRE L. GUMAER, OF LONG BEACH, CALIFORNIA, ASSIGNOR TO THE TEXAS COMPANY, OF NEW YORK, N. Y., A CORPORATION OF DELAWARE

DRUM BRAKE

Application filed November 22, 1930. Serial No. 497,378.

This invention relates to drum barrels.

When metal drums, barrels and the like are moved from place to place in considerable numbers, the usual practice is to roll them on their chimes upon inclined chutes or runways, and to provide some means for stopping the drums or slowing them down to the desired speed at the end of the runway. All methods of stopping or slowing metal drums by man-power are inherently dangerous from a safety standpoint, and uneconomical from an operating standpoint. On the other hand, when mechanical brakes are employed they should be so designed as to (1) eliminate any danger of marring or otherwise damaging the drums or the paint, (2) be capable of slowing or stopping the drums regardless of their initial speeds, and (3) be capable of being regulated within wide limits so that drums may be slowed down to any desired speed without twisting or slewing them on the runway.

Accordingly, my invention contemplates and has for an object to provide a barrel chute or runway having a brake for automatically stopping or checking the movement of drums being rolled thereon, regardless of their initial speed and without damage to the drums or to the paint thereon.

Other objects, features and advantages of the invention will appear as the description thereof proceeds, reference being had to the accompanying drawings, in which Fig. 1 is a view in side elevation of a portion of a barrel runway having a drum brake constructed in accordance with my invention.

Fig. 2 is a top plan view of the same apparatus.

Fig. 3 is a vertical sectional view taken on the line 3—3 of Fig. 1, and

Fig. 4 is an enlarged detail view of a portion of the apparatus.

Figure 1:
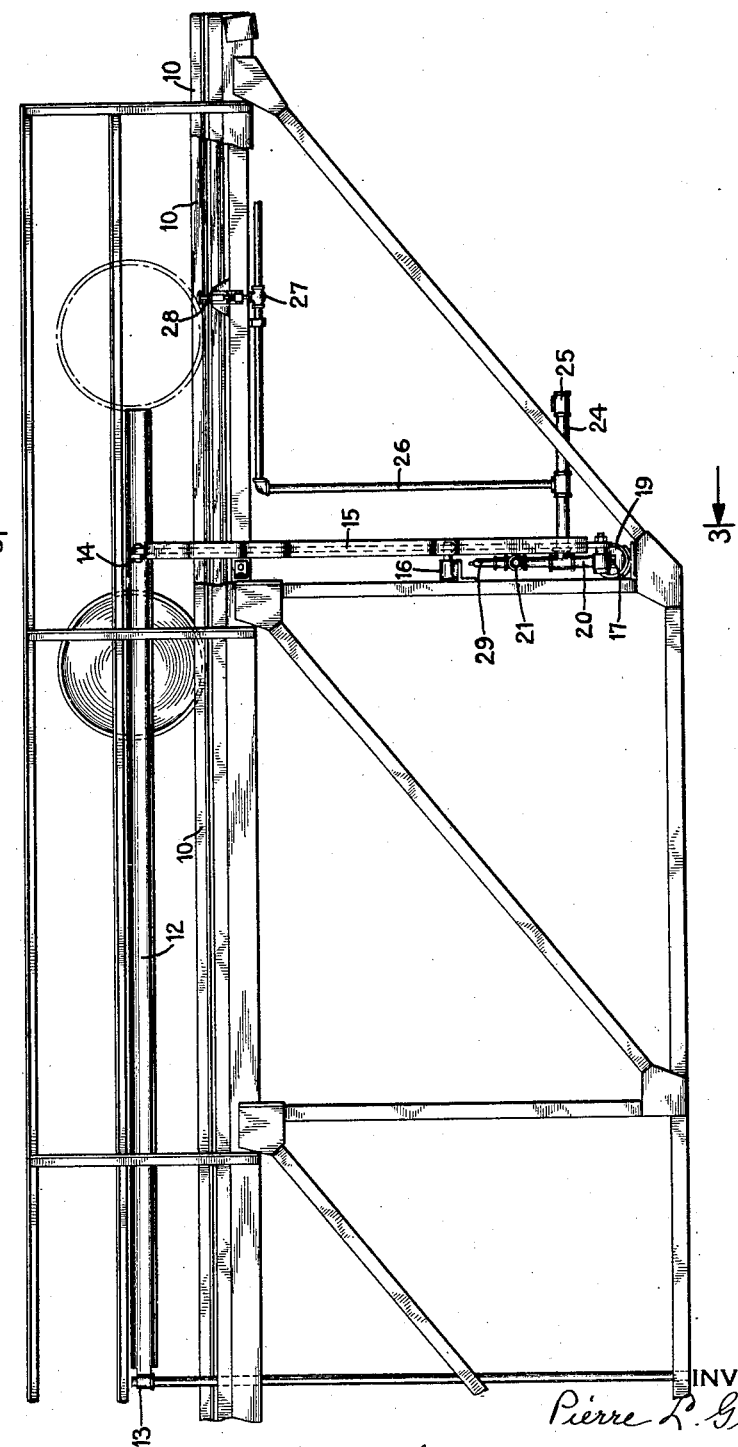

Referring to the drawings, there is shown the customary chute or runway provided with tilted iron tracts 10 upon which the drums are rolled, the runway being inclined so that the rolling of the drums is effected by gravity. The tracts are supported upon a suitable framework which also supports a walkway 11 at one side of the runway.

The drum brake is ordinarily positioned at or near the end of the runway although obviously, if desired, it can be positioned at any other point, and more than one brake can be used if necessary on account of the length and inclination of the runway.

The brake comprises a pair of brake bars 12 positioned on opposite sides of the runway and pivotally mounted at one end in bearings 13. The opposite ends of the bars are connected through pivot bearings 14 to the upper ends of oppositely disposed S-shaped supporting or rocker arms 15. The arms 15 are pivotally mounted intermediate their ends in bearings 16 mounted on the runway frame, and their lower ends are secured to connecting rods 17 which are in turn secured at their opposite ends to pistons 18 operatively mounted within an air cylinder 19.

The upper ends of arms 15 are curved to provide for proper clearance of the tracks during the operation of the arms and the adjacent surfaces of the brake bars 12 are slightly curved to eliminate the possibility of any irregularities on the chimes from fouling on the bars.

A pipe 20 connects with the interior of cylinder 19 at a point intermediate its ends to permit the entry and escape of air to and from the cylinder 19. A branch pipe 21 connects with pipe 20 and is provided at its outer end with a gate valve 22 which may be opened to any desired extent to permit the passage of air therethrough. Valve 22 is provided with an elongated valve stem 23 which extends upwardly to a point where it can be conveniently reached by an operator on the walkway 11.

Another line or pipe 24 connects at one end with pipe 20 and at the other end to a swing check valve 25 which opens freely to admit air to the cylinder 19 if it is at any time desired to force the brake bars together by hand.

Another line or pipe 26 connects at one end with pipe 24 at a point between the valve 25 and the point of connection with pipe 20. The opposite end of this pipe also connects with the plant compressed air line. The passage of air through this line 26 is controlled by means of a whistle valve 27 which is equipped with a reset or spring actuated stem 28 which extends upwardly between the tracks 10. Barrels or drums, after passing between brake bars 12, roll over the reset or stem 28 and depress it, thereby opening the valve 27 and permitting a charge of compressed air to pass through the pipe 26 to the cylinder 19. As soon as the drums or barrels clear the reset 28, the valve 27 is automatically closed and no further air passes through the pipe 26 until a succeeding barrel moves the stem to actuate the valve.

In operation, barrels roll down the runway until they reach the braking mechanism at which time the opposite chimes of each successive barrel contact with the oppositely disposed brake bars. Each rolling barrel, upon striking the free ends of the brake bars, causes them to move outwardly, thereby actuating the rocker arms and the pistons within the cylinder 19. The air in the cylinder is immediately compressed and forms a cushion which will absorb the force of the impact between the barrel and the brake bars, and the slow escape of air from the cylinder allows the brake bars to gradually separate until the barrel passes from between the brake bars and moves on down the runway at a reduced speed.

Apparatus of the preferred form and construction has been illustrated and described for the purpose of showing one manner in which it may be practiced, but the inventive thought upon which this application is based is broader than this illustrative embodiment thereof, and no limitations are therefore intended other than those imposed by the appended claims.

I claim:

1. In combination with a barrel runway, a cylinder having a pressure fluid inlet intermediate its ends, pistons in said cylinder on opposite sides of said inlet, S-shaped rocker arms pivotally mounted on opposite sides of the runway, means operatively connecting each of the rocker arms with one of the pistons, a brake bar operatively connected to each of the rocker arms and adapted to contact with the chime at one end of a barrel on the runway, and means for periodically admitting pressure fluid to the cylinder to actuate the pistons and move the brake bars into braking position.

2. In combination with a barrel runway, a cylinder having a pressure fluid inlet intermediate its ends, pistons in said cylinder on opposite sides of said inlet, S-shaped rocker arms pivotally connected on opposite sides of the runway, means operatively connecting each of the rocker arms with one of the pistons, brake bars operatively connected to each of the rocker arms, means for periodically admitting the pressure fluid to the cylinder to actuate the pistons and move the brake bars into braking position, and means for permitting the pressure fluid to escape to release the pressure on the brake bars.

3. The combination with a barrel runway, a brake bar movably mounted on the runway and adapted to engage the end of a barrel rolling on the runway to retard the speed thereof, pressure actuated means operatively connected with the brake bar for actuating the bar into operative position, and means adapted to be actuated by a barrel on the runway for admitting pressure fluid to the brake bar actuating means.

4. In combination with a barrel runway, a brake bar pivotally mounted on the runway and adapted to yieldingly engage an end of a barrel rolling on the runway to retard the speed thereof, a cylinder having a pressure fluid inlet, a piston in said cylinder adapted to be actuated by the pressure fluid in the cylinder, means operatively connecting the piston and the brake bar, and means for admitting pressure fluid through the inlet in the cylinder to actuate the piston and the interconnected brake bar into operative position.

5. In combination with a barrel runway having a movable brake bar adapted to engage a barrel rolling on the runway to retard the speed thereof, pressure actuated means for regulating the movement of the brake bar, means connecting said pressure actuated means with the brake bar, and means adapted to be actuated by a barrel on the runway for admitting pressure fluid to the brake bar regulating means.

In witness whereof I have hereunto set my hand this 8th day of November, 1930.

PIERRE L. GUMAER.